United States Patent [19]

Newbould et al.

[11] 4,318,839

[45] Mar. 9, 1982

[54] POLYAMIDE BASED THERMOPLASTIC BODY SOLDER

[75] Inventors: John Newbould, Fraser; Angelo J. Cosentino, Warren; Paul E. Wright, St. Clair Shores, all of Mich.

[73] Assignee: General Motors Corporation, Detroit, Mich.

[21] Appl. No.: 227,715

[22] Filed: Jan. 23, 1981

[51] Int. Cl.$^3$ .............................................. C08L 77/06
[52] U.S. Cl. ................................... 524/538; 524/919; 523/220
[58] Field of Search ...................... 260/37 N; 525/432

[56] References Cited

U.S. PATENT DOCUMENTS

| | | | |
|---|---|---|---|
| 2,193,529 | 3/1940 | Coffman | 525/432 |
| 2,698,966 | 1/1955 | Stott et al. | 525/432 |
| 3,371,055 | 2/1968 | Illing et al. | 260/37 N |
| 3,875,129 | 4/1975 | Herwig et al. | 260/37 N |
| 4,062,819 | 12/1977 | Mains et al. | 525/432 |
| 4,148,775 | 4/1979 | Shims et al. | 260/30.8 R |

Primary Examiner—Lewis T. Jacobs
Attorney, Agent, or Firm—E. F. Harasek

[57] ABSTRACT

An extrudable thermoplastic body solder which has the necessary physical properties for automotive applications is formed from a mixture of high and low viscosity nylons based on dicarboxylic acids and hexamethylene diamine filled with suitable particulate and fibrous fillers.

3 Claims, 2 Drawing Figures

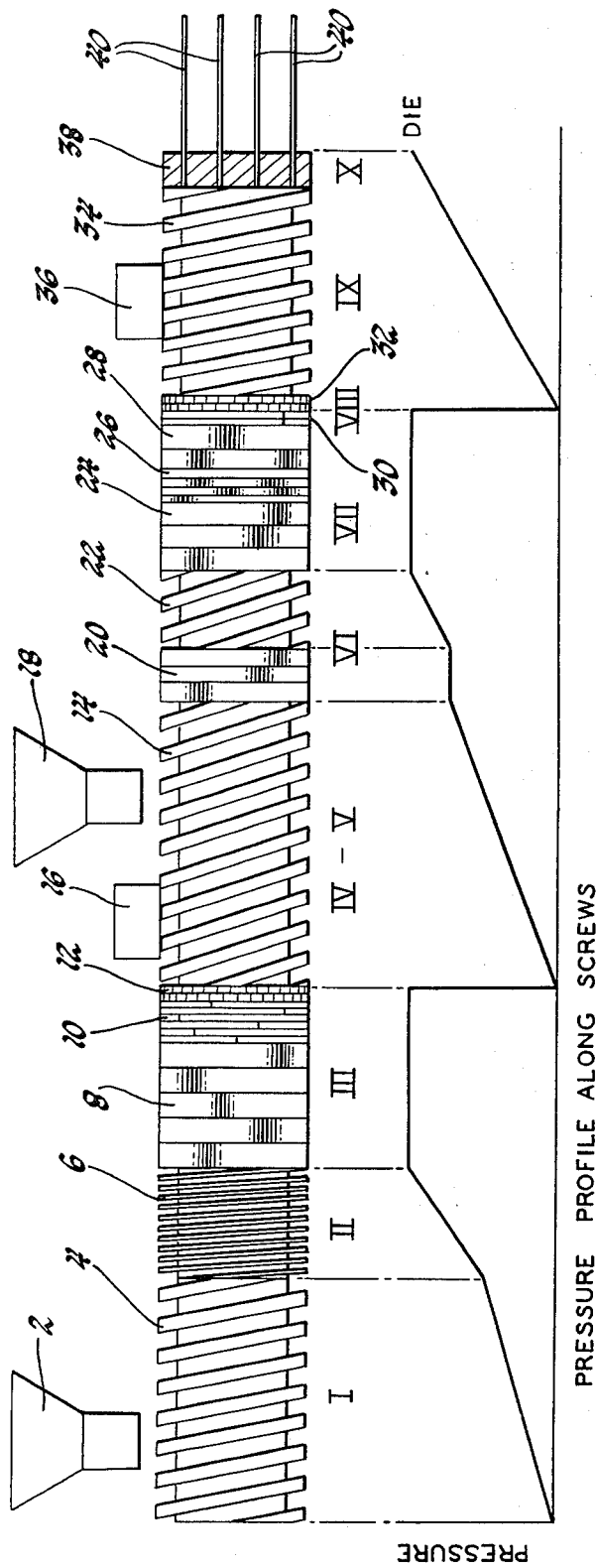
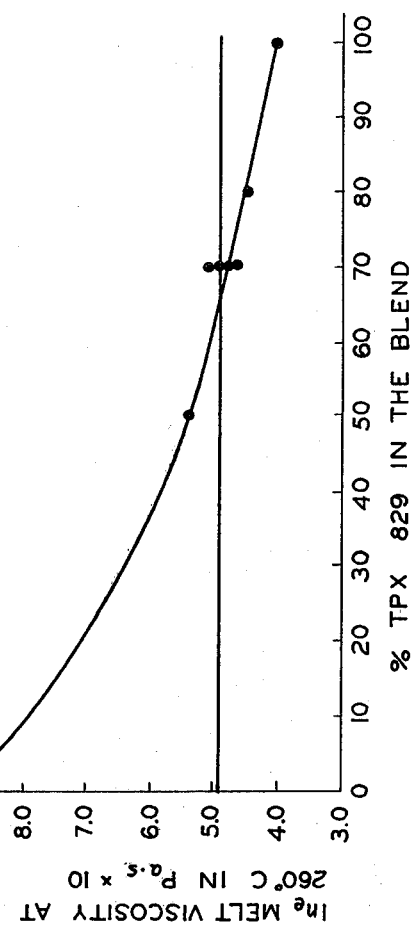
Fig. 1
Fig. 2

POLYAMIDE BASED THERMOPLASTIC BODY SOLDER

BACKGROUND OF THE INVENTION

This invention relates to thermoplastic body solders. More particularly, the invention relates to a combination of high and low melt viscosity polyamide resins reinforced with particulate and fibrous fillers under heat and high shear to form a body solder with unexpectedly high sag resistance and excellent physical properties.

Automotive body panels are generally joined by lap welds. The resulting trough-like joints are filled in with lead or polymer based body solder and sanded to a smooth finish before painting.

Considerable efforts have been made toward developing polymeric body solders because they are lighter and less expensive than lead. However, such replacements must be as adaptable as lead for automotive assembly line use. A polymeric solder should be easy to apply and not sag on a vertically oriented surface at application temperatures or the elevated temperatures encountered in paint drying ovens. It must be compatible with automotive paint systems and should resist delamination, corrosion and cracking due to impact or thermal cycling.

U.S. Pat. No. 4,187,348, assigned to the assignee of this invention, relates to a thermoset-type polymeric body solder. It is based on the combination of epoxy, polysulfide rubber and an imidazole curing agent. The final polymerization reaction takes place after application to a car body. The principal disadvantage of the system is that once the constituents are mixed, the solder begins to cure. It must then be maintained at very low temperatures, e.g., 0° C., or used within a matter of hours.

Thus it would be desirable to provide a thermoplastic rather than thermosetting body solder. A thermoplastic solder would have a virtually unlimited shelf life and could be applied to a car by remelting solid stock as done with lead solders.

It is therefore an object of this invention to provide a thermoplastic body solder which exhibits good adhesion to a metal substrate, does not sag at application or paint oven temperatures, is receptive to automotive paints, does not corrode, and is impact resistant. A more particular object of the invention is to provide a thermoplastic body solder that may be preblended and then remelted in conventional extrusion equipment for easy application to an automotive body under assembly line conditions. Another object is to provide a thermoplastic body solder resin blend having a predetermined melt viscosity that in a filled state yields a body solder with desired application properties and durability. Another object is to provide a filler system for such resin blend that suitably reinforces the body solder.

A more particular object of the invention is to provide a spreadable hot melt polymeric body solder composition based on a mixture of high and low melt viscosity polyamide resins which when blended under high shear and heat, form a stable composition having unexpectedly high resistance to sag. When such mixture of polyamides is filled with suitable powdered and fibrous fillers, it acquires and retains the desired physical properties for an automotive body solder.

A further object of the invention is to provide a method of making such a thermoplastic body solder. A more particular object is to provide a method of blending high and low melt viscosity polyamide resins to provide a body solder composition that has a high enough melt viscosity to resist sag but is easy to melt and apply to a solder joint.

BRIEF SUMMARY OF THE INVENTION

In accordance with a preferred practice of our invention, these and other objects may be accomplished by formulating a body solder as follows. The amount of each constituent is in parts by weight unless otherwise stated.

100 parts of a blend of polyamide resins based on a dicarboxylic acid, preferably azelaic acid, and hexamethylene diamine is formed from about 50 to 80 parts of such polyamide resin having a melt viscosity at 260° C. of about 10 to 250 Pascal-seconds and the balance of such polyamide resin having a melt viscosity of 260° C. of about 1500 to 2000 Pascal-seconds. The polyamide resins are melted together and blended under high shear to yield a product with a melt viscosity of about 90–250 Pascal-seconds. From about 125 to 170 parts powdered filler and 10 to 30 parts of fibrous filler are combined with the resin. The resulting composition has a melt viscosity at an application temperature of about 260° C. such that it is skivable onto a vertically oriented metal substrate. After application, the composition will not sag at temperatures up to 200° C. and is corrosion and crack resistant.

DETAILED DESCRIPTION OF THE INVENTION

Our invention will be better understood in view of the following Figures and detailed description.

FIG. 1 is a diagrammatic view of a twin screw extruder suitable for use in the practice of the invention.

FIG. 2 is a graph of the melt viscosity of a blend of high and low melt viscosity polyamide resins at 260° where the abscissa is the percent low melt viscosity polyamide in the blend and the ordinate is the natural logarithm of the melt viscosity in Pascal-seconds of the composition at 260° C.

In accordance with the invention, suitable polyamide resins are condensation products of diamines and dicarboxylic acids. The preferred diamine is hexamethylene diamine (HMDA). Suitable dicarboxylic acids are of the type

where n=6 to 12. The preferred dibasic acids are azelaic acid [COOH(CH$_2$)$_7$COOH] and sebacic acid [COOH(CH$_2$)$_8$COOH]. The subject condensation products of HMDA and the dicarboxylic acids demonstrated good resistance to degradation in the presence of heat and moisture so that pelletized resins may be processed in ordinary extrusion melting equipment without the stringent drying and handling requirements of more hygroscopic polyamides.

In the practice of the invention, the polyamide resins are particularly characterized by their melt viscosities. Melt viscosities of the polyamides were measured in a Burrell-Severs capillary rheometer before incorporation in the body solders. In the rheometer, a molten material is forced through a capillary tube 1.56 mm in diameter by nitrogen pressure. The rheometric values are determined from the rates of extrusion of material at various pressures of nitrogen. Polyamides of different melt viscosities may be made from the same difunctional carboxylic acid and diamine stocks by varying the polymerization times and the reaction conditions according to techniques well known in the nylon art. It is important to the practice of the invention that the polyamides chosen by thermally stable at compounding, application, and paint oven temperatures. Such polyamides generally show an initial increase in viscosity when heated and maintained at a temperature above 200° C. The compositions may exhibit some degradation and decreased viscosity after exposure times of, e.g., 2 hours at 260° C. but should not initially degrade at these temperatures.

This invention specifically involves melting a high melt viscosity polyamide with a low melt viscosity polyamide under high shear conditions to create a mixture that has higher than expected sag resistance and other improved physical properties. The low melt viscosity polyamide resin component should generally have a melt viscosity of 10 to 250 Pascal-seconds measured at 260° C. in the Burrell-Severs rheometer. The high melt viscosity polyamide compound should have a melt viscosity at 260° C. between about 1500 and 2000 Pascal-seconds. 100 weight parts of a blend of the low and high viscosity resins should comprise about 50 to 80 parts of the low melt viscosity resin and the balance the high melt viscosity resin. The target melt viscosity for the unfilled mixture after melting and high shear mastication should be in the range of 90 to 250 Pascal-seconds. A single polyamide resin, i.e., one that is not a blend of high and low melt viscosity resins, does not produce a sag resistant body solder even if its initial melt viscosity is in the 90 to 250 Pascal-second range.

The blended polyamide resins are combined on a weight basis with about 1.5 to 2.5 (preferably about 2.0) parts filler per part polymer. Fillers are necessary to provide high temperature sag resistance, spreadability, and decreased thermal expansion. The preferred filler system for this invention is a combination of small powder particles and a small portion of natural or synthetic fibers. The preferred particle filler is silica powder, however other fillers such as clay, reground resin, metal powder, etc. may be useful. The preferred fiber filler is chopped strand fiberglass where the fibers have a length less than about 7 millimeters. Other fibrous type fillers, such as carbon, asbestos, metal, fibrous talc, etc. could also be suitable. If silica is chosen as a filler, it is preferred to pretreat it with a surfactant to promote dispersion into polyamide resins. Preferred surfactants are silane and/or phenolic resins added at a weight ratio of about 1% to silica flour. The weight ratio of powder to fibrous filler should be in the range of about 7:1 to 11:1, the preferred ratio being about 9:1.

In order to get the desired increase in viscosity in mixed high and low viscosity polyamide resins, and an accompanying increase in sag resistance, it is necessary to blend them in a melted condition under high shear. We prefer to mix dry pellets of the polyamide resins in the desired weight proportions and then process them through a twin screw extruder. One such extruder is sold by Werner and Pfleiderer and is designated Model 53-D-ZSK. The twin screws of the Werner and Pfleiderer machine lie adjacent one another so that pumping action is provided by their tandem motion. The screws themselves are of modular construction so that screw sections may be tailored to a desired processing step. For example, coarse thread screws may be used to transport and initially melt a resin, while fine kneading blocks may be used to create high shear and fine blending. The barrel is also built up of modular housing sections which bolt together. Each barrel section may be fitted with heating and cooling devices to enable any desired temperature profile to be achieved in the extruded material.

FIG. 1 shows a schematic representation of a twin screw extruder which may be used to compound the subject body solders. Ten barrel sections (indicated by Roman Numerals I to X), each with a length to diameter ratio of 3.4 to 1 were coupled together, giving an overall length to diameter ratio of 34 to 1. A mixture of high and low melt viscosity nylon resin pellets is fed from hopper 2 into the helical screws 4 of barrel Section I and melted in Section II. Helical screws 6 of Section II are larger than those of Section I to reduce the available volume for the nylon resins and increase the barrel pressure as indicated by the pressure profile. The pressure builds up from near atmospheric at the feed hopper 2 substantially along the first two stages. Melting is completed in Section III where a twin set of coarsely spaced kneading blocks 8 work the resin. Fine kneading blocks 10 terminating in reverse flight blocks 12 are provided in the last portion of Section III to create the high shear necessary to cause the low and high viscosity polyamide resins to react together and create a higher viscosity product. We believe that melting and masticating the mixed polyamides originally substantially reduces their melt viscosities but that they react together to form a polymeric material with a higher melt viscosity and improved physical properties for a body solder. Thereafter, the kneading blocks 12 pass the resin into Section IV which contains conventional helical screw conveying elements 14. The volume provided for the resin in the tolerance between screws 14 and the barrel provides a large pressure drop at the beginning of Section IV. A vent 16 is provided to exhaust any vapor from the resin. A vacuum may be drawn on vent 16 to promote degassing of the polyamide. Section V also contains helical screws 14 like those of Section IV. Filler is force fed into the resin in Section V by means of an overhead single screw power auger 18. The pressure within the barrel gradually increases downstream of the vent in Section IV.

The filler and resin are preliminarily mixed in Section VI moving first through kneading blocks 20 and then a helical screw 22 conveyor section. Final high intensity compounding is carried out in Sections VII and VIII. Section VII comprises a combination of coarse kneading blocks 24 followed by fine kneading blocks 26. Section VIII comprises a set of coarse kneading blocks 28 followed by fine blocks 30 with a reverse flight configuration on end blocks 32. The mixing accomplished in Sections VII and VIII occurs at high pressure. The extensive use of kneading blocks downstream of filler addition port 18 provides the degree of mixing necessary to disperse and wet out the particulate silica and fiberglass in polyamide. Sections IX and X again have conventional helical screw conveying elements 34. A vacuum port 36 was installed in Section IX in a low pressure zone to remove any remaining volatiles and minimize porosity in the extruded product. Section X outlets at an extrusion head strand die 38. Stands 40 are cooled in a water bath, dried, and chopped into pellets for later use in an assembly line melt extruder applicator. The speed of the screws during the compounding in the extruder is about 250 revolutions per minute. No aggregation of silica powder has been observed in the pelletized material. Cut edges of randomly sampled pellets have been examined under scanning electron microscopes at magnifications of 300 and 1000. The micrographs show excellent adhesion between the resin and the silica filler and fiberglass in the products. Discrete silica particles are not readily observable in the photographs. No fiberglass bundles have been found. The bundles being effectively broken up into discrete fibers by the twin screwing processing.

In a preferred embodiment, hot melt body solder compositions were made from three polyamide resins which were condensates of azelaic acid and hexamethylene diamine made and sold by Henkel Company. Table I sets forth the commercial designations and melt viscosities for these nylon resins.

TABLE I

| Resin | Commercial* Designation | Melt Viscosity at 260° C. (Pa · s) |
|---|---|---|
| Az-HMDA | TPX 822 | 1730 |
| Az-HMDA | TPX 829 | 22 |
| Az-HMDA | TPX 11215 | 184 |

*Made by Henkel Company

The components were mixed in a twin screw extruder of the type described above. Table II sets forth several of the extruder operating parameters. Table III lists the suppliers and trade designations of constituents used in the body solders.

TABLE II

Typical Compounding Condition for Polyamide Based Hot Melt Body Solders

| | |
|---|---|
| Extruder* Type | Twin Screw |
| Drive power available kW | 44.75 |
| Resin feed rate kg/hr | 41 |
| Filler feed rate kg/hr | 82 |
| Barrel Temperatures: °C. | ~ 250° C. |
| Melt Temperature °C. | 266 |
| Power Load kW | 16.2 |
| Power Load % of available torque | 36.2 |
| Pressure at vacuum vent mmHg | 51 |

*Werner and Pfleiderer Corp., Waldwick, N.J.

TABLE III

Sources of Materials

| | |
|---|---|
| Polyamide Resins | Henkel Co. |
| Novacite and Novakup Silica | Malvern Minerals Co. |
| | Hot Springs, Arkansas |
| A-1100 Silane and | |
| BLSB-3536 Phenolic Resin | Union Carbide Co. |

TABLE III-continued

Sources of Materials

| | |
|---|---|
| Chopped Strand Fiberglass | Owens-Corning Co. |

Referring to Table IV, two body solder formulations based solely on (Henkel TPX 11215 melt viscosity 184 Pascal-seconds) were made. One was filled with 162 parts silica filler treated with silane and 18 parts milled fiberglass per 100 parts polyamide resin. The other was filled with a like proportion of silica treated with phenolic resin and fiberglass.

Three other compositions were formed from mixtures of high and low melt viscosity polyamides. The first composition was made up of 85% Henkel TPX 829 polyamide with a melt viscosity of 22 Pascal-seconds and 15% Henkel TPX 822 polyamide with a melt viscosity of 1730 Pascal-seconds. The second formulation contained 70 weight percent of the TPX 829 polyamide and 30 weight percent of the TPX 822 polyamide. The third formulation contained 80 weight percent of the Henkel TPX 11215 polyamide resin having a melt viscosity of 184 Pascal-seconds and 20% of a Henkel TPX 822 polyamide having a viscosity of 1730 Pascal-seconds. The melt viscosities of the blends after high shear mixing are shown at column 3. The melt viscosity of the 85:15 mixture of TPX 829:TPX 822 (65 Pascal-seconds) was lower than desired. Filler was mixed into the polyamide resins in the amounts indicated at Table IV in the twin screw extruder as set forth above. It can be seen from Table IV that even though the first two body solders made of the single polyamide with a melt viscosity of 185 Pascal-seconds at 260° C. had an initially higher resin melt viscosity than the blends, and were provided with a slightly greater amount of filler, the body solder compositions sagged at 204° C. Unexpectedly, the blends of the high and low viscosity resins which initially had melt viscosities substantially below 184 Pascal-seconds showed no sag at 204° C. This is an unexpected result since higher melt viscosity resins generally exhibit higher sag resistances at like elevated temperatures.

TABLE IV

Polyamide Hot Melt Body Solder Formulations

| Polyamide Types and Ratio | Polyamide Resin or Blend Melt Viscosity at 260° C. in Pa · S | Silica Filler Surface Treatment | Amount of Surface Treatment % by Weight | Parts 847A Fiberglass per 100 Parts Polyamide | Parts Treated Silica per 100 Parts Resin | % Fiberglass in Total Compound | Sag Properties at 204° C. |
|---|---|---|---|---|---|---|---|
| TPX 11215 (100%) | 184 | A-1100 silane | 1.0 | 18.0 | 162 | 6.4 | slight sag |
| TPX 11215 (100%) | 184 | BLSB 3536 phenolic resin | 1.25 | 18.0 | 162 | 6.4 | slight sag |
| TPX 829-TPX 822 (85:15) | 65 | A-1100 silane | 1.0 | 17.3 | 156 | 6.3 | no sag |
| TPX 829-TPX 822 (70:30) | 100 | " | 1.0 | 16.4 | 148 | 6.2 | " |
| TPX 11215-TPX 822 (80:20) | 126 | " | 1.0 | 16.7 | 150 | 6.3 | " |

FIG. 2 shows the melt viscosity of blends of Henkel TPX 822 (melt viscosity 1730 Pascal-seconds) and TPX 829 (melt viscosity 22 Pascal-seconds) resins at 260° C. The percent TPX 829 in the blend is plotted along the X axis while the natural log of the melt viscosity at 260° C. is shown along the ordinate. The target melt viscosity is the experimentally determined melt viscosity of mixtures of these polyamide resins which when filled with a suitable amount of filler produces a processable body solder with the desired physical properties of sag resistance, impact resistance, corrosion resistance, etc. We have found that the preferred target melt viscosity of suitable blended high and low melt viscosity polyamides is in the range from about 90 Pascal-seconds (ln 90=4.49) to about 250 Pascal-seconds (ln 250=5.52). The Table shows that the preferred amount of low melt viscosity resin in this particular combination of TPX 822 and 829 polyamides is about 70%. Obviously, the initial melt viscosities of the polyamide constituents would determine the particular amounts of each of high and low melt viscosity constituents for a particular body solder composition.

The body solders of Table II were applied to test panels for determination of their physical properties. The panels comprised two sheets of lapped 0.94 mm gauge steel pinch welded at the center. The lap weld formed a trough about 76.2 mm wide and 6.4 mm deep. Each welded panel was square with a length of about 254 mm per side. The panels were prepared for soldering by vapor degreasing in trichloroethane followed by sand blasting. The panels were primed with Inmont U28-K-AD025 primer from which the slow solvents and fluorocarbon flow control agents had been omitted. The polyamide based thermoplastic solders were extruded at 260° C. using a 35 mm Killian Co. linear extruder fitted with a two-stage vented screw. Vacuum was applied to a vent located between two screw stages to remove any entrapped gas. The pelletized solder prepared as above, was extruded onto the primed and preheated test panels in essentially the same manner that the lead solder would be. A generally smooth surface contour was obtained by rough grinding the cooled body solder with a special number 36 grit grinding disc. Finish grinding was performed using number 100 grit grinding discs. Any defects or porosity caused by air being entrapped during the skiving were repaired by heating the area of the defect with a hot air gun and then filling the defect with molten body solder using a spatula.

Test panels were cleaned and phosphated. They were then primed and painted with an acrylic top coat.

The painted panels were evaluated using three standard environmental tests:

1. Salt Spray Corrosion Cycles: panels are placed in a 5% aqueous sodium chloride spray at 100° C. for 4 hours followed by 18 hours at 37.8° C., 100% relative humidity, and 2 hours at −23° C. Four of these cycles are run per week, the sample being retained in the cold box at −23° C. at other times. The sample must pass 30 of the above cycles without developing any flaws.

2. Sag Resistance: test panels, prepared as described above, are sanded but not painted. The panels are placed in a vertical position in an air circulating oven at 204° C. for thirty minutes. An acceptable body solder will show no sign of sag.

3. Impact Resistance: the panels are impacted at −29° C. with a 5 centimeter diameter steel ball dropped from a height of 34 cm. The resulting impact on the panel is approximately 1.87 Joules. To pass the test, the body solder should not crack.

Table V shows the test results for the corrosion and impact testing of the polyamide body solder formulations of Table III. It can be seen that the formulation of 85% low melt viscosity—15% high melt viscosity polyamide only withstood 13 corrosion cycles on one test panel and failed the cold impact test. We believe this is because the percentage of low viscosity resin in the formulation was too high. The other two formulations, however, performed well on the corrosion cycle tests and the impact tests. As seen at Table IV, neither of the single polyamide resin containing formulations met the sag resistance criteria. All of the high viscosity-low viscosity formulations did. The excellent results obtained in the corrosion and impact tests are indicative of good adhesion between the body solders and steel.

TABLE V

Corrosion Cycle and Impact Testing of Polyamide Based Hot Melt Body Solders

| Formulation | Corrosion Cycles Passed | | | | Result of cold Impact Test |
|---|---|---|---|---|---|
| | Panel 1 | Panel 2 | Panel 3 | Panel 4 | |
| TPX 829: TPX 822 85:15 | 13 | 30 | 30 | 30 | FAIL |
| TPX 829: TPX 822 70:30 | 28 | 30 | 30 | 30 | PASS |
| TPX 11215: TPX 822 80:20 | 30 | 30 | 30 | 30 | PASS |

Thus we have discovered that the combination of high and low melt viscosity polyamide resins blended together under high shear and combined with controlled amounts of powder and fibrous fillers yield compositions with all the requisite properties for an automotive body solder. Moreover, these compositions may be processed in relatively simple hot melt equipment that will take no more space and require no specialized processing than lead based body solders. While body solders made according to our invention must contain the above specified ingredients, those skilled in the art may add small amounts of other ingredients without interfering with the practice of the invention.

While our invention has been described in terms of specific embodiments thereof, it will be appreciated that other forms can be readily adapted by one skilled in the art. Therefore, the scope of our invention is to be limited only by the following claims.

The embodiments of the invention in which an exclusive property or privilege is claimed are defined as follows:

1. A thermoplastic filler reinforced body solder composition comprised in parts by weight of
   100 parts of a blend of polyamide resins consisting essentially of condensation products of dicarboxylic acids having the structure $HOOC\text{-}(CH_2)_n\text{-}COOH$ where n is 6 to 12 and hexamethylene diamine, said blend comprising from about 50–80 parts of a said resin having a melt viscosity at 260° C. of about 10 to 250 Pascal-seconds and the balance a said resin having a melt viscosity at 260° C. of about 1500 to 2000 Pascal-seconds, said blend having a melt viscosity at 260° C. of from about 90 to 250 Pascal-seconds;
   150 to 250 parts filler comprising powder particles and fibers in the weight ratio of from about 7:1 to 11:1, respectively,
   wherein said body solder does not sag on a vertically oriented substrate at 204° C., does not crack after 30 test cycles consisting of 18 hours at 37.7° C. in 100% relative humidity followed by 2 hours at −23° C. followed by 4 hours in 5 percent aqueous salt spray at 95° C., and does not crack under a 1.7 joule impact at −29° C.

2. An extrudable filler reinforced thermoplastic body solder composition comprised in parts by weight of 100 parts of coextruded polyamide resins consisting essentially of condensation products of dicarboxylic acid taken from the group consisting of sebacic acid and azelaic acid and hexamethylene diamine, said blend comprising from about 50-80 parts of a said resin having a melt viscosity at 260° C. of about 10 to 250 Pascal-seconds and the balance a said resin having a melt viscosity at 260° C. of about 1500 to 2000 Pascal-seconds, said blend having a melt viscosity of from about 90 to 250 Pascal-seconds;

150 to 250 parts filler comprising silica powder and glass fibers in the weight ratio of about 9:1, respectively;

which solder composition after application does not sag on a vertically oriented substrate at 204° C., does not crack after 30 test cycles consisting of 18 hours at 37.7° C. in 100% relative humidity followed by 2 hours at −23° C. followed by 4 hours in 5 percent aqueous salt spray at 95° C., and does not crack under a 1.7 joule impact at −29° C.

3. A method of making an extrudable thermoplastic polyamide composition which is adherent to metal and suitable for use as an automotive body solder comprising the steps of melting 100 weight parts of a mixture of polyamide resins based on azelaic acid and hexamethylene diamine consisting essentially of a blend of from about 50-80 weight parts resin having a melt viscosity at 260° C. of about 10 to 250 Pascal-seconds and the balance resin having a melt viscosity at 260° C. of about 1500 to 2000 Pascal-seconds, subjecting said molten polyamide resin mixture to high shear blending such that the resins react with one another to produce a sag resistant product;

dispersing from about 150 to 250 weight parts filler comprising silica powder and fiberglass in a proportion of from 7:1 to 11:1, respectively in said melted polyamide resin; and subjecting said dispersion to a vacuum to remove any gas therefrom;

wherein said composition, after application to a metal substrate, does not sag on a vertically oriented surface at 204° C., does not crack after 30 test cycles consisting of 18 hours at 37.7° C. in 100% relative humidity, 2 hours at −23° C. followed by 4 hours in 5 percent aqueous salt spray at 95° C., and does not crack under 1.7 joule impact at −29° C.

* * * * *